Oct. 20, 1925.
A. W. SYNOGROUND
POKE
Filed Jan. 6, 1925
1,557,742
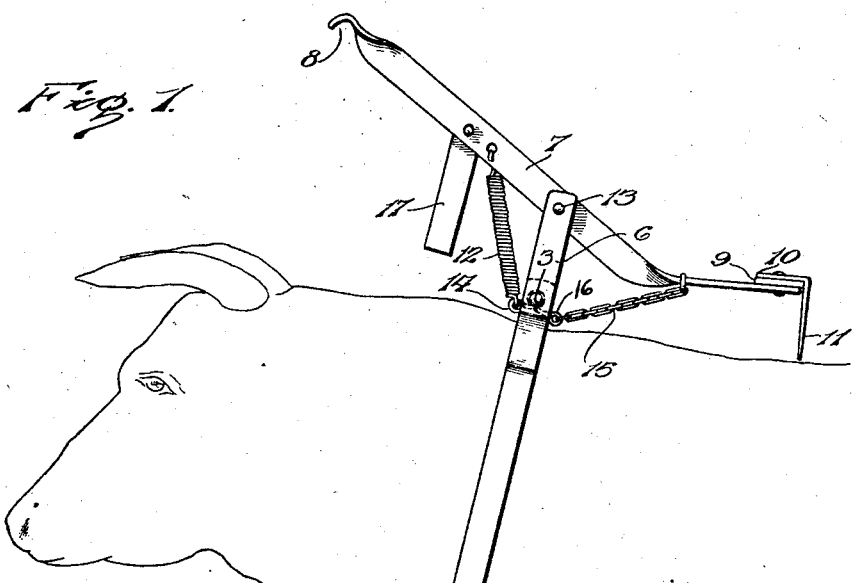
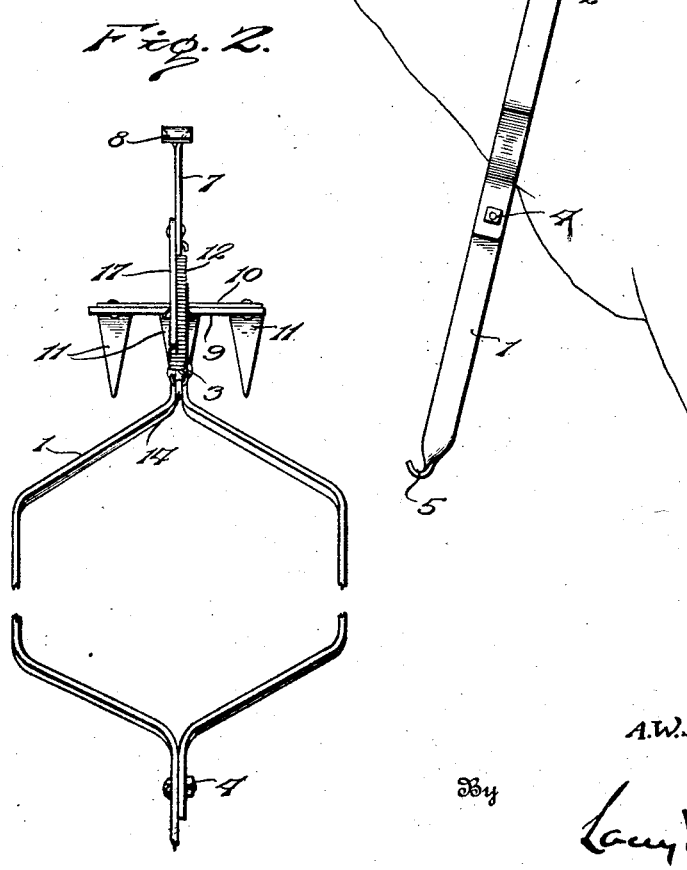
Inventor
A.W. Synoground
By
Lacy & Lacy, Attorneys Patented Oct. 20, 1925.

1,557,742

UNITED STATES PATENT OFFICE.

AUGUST W. SYNOGROUND, OF NORTONVILLE, NORTH DAKOTA.

POKE.

Application filed January 6, 1925. Serial No. 889.

*To all whom it may concern:*

Be it known that I, AUGUST W. SYNOGROUND, a citizen of the United States, residing at Nortonville, in the county of La Moure and State of North Dakota, have invented certain new and useful Improvements in Pokes, of which the following is a specification.

This invention relates to animal pokes and has for its object the provision of a simple and inexpensive device which will operate efficiently to prevent cows or other live stock from breaking through a wire fence. The invention seeks to provide a poke which may be easily placed upon the animal and in which the deterring element will be located above the animal's neck and yieldingly held out of contact therewith but so arranged that any attempt of the animal to break through the fence will cause said element to press upon the animal's neck and by such pressure cause the animal to back away from the fence. Other incidental objects of the invention will appear in the course of the following description, and the invention consists in certain novel features which will be particularly pointed out in the appended claims.

In the accompanying drawing:

Figure 1 is a side elevation of my improved poke showing the same arranged for use, and Fig. 2 is a front elevation.

The poke comprises a frame adapted to fit about the neck of the animal and consisting of two bowed bars 1 and 2 which have their extremities disposed one against the other and bolted together, as indicated at 3 and 4. The lower end of the bar 1 depends below the lower end of the bar 2 and is formed with a terminal hook 5 which is adapted to engage in a strand of a wire fence should the animal attempt to jump over the fence or attempt to break through an upper part of the fence at a point too high to be engaged by the upper members of the poke. When this hook 5 is engaged with a fence wire strand, the engagement with the fence wire will cause the lower end of the poke to press rearwardly against the breast or throat of the animal and by such a pressure will cause such discomfort that the animal will involuntarily move away from the fence. In fitting the frame or yoke to the animal, the bolt 4 is removed so that the frame bars 1 and 2 may be slightly separated to permit them to be passed at opposite sides of the animal's head and neck. When the yoke has assumed the position shown in Fig. 1, the bolt 4 is replaced and secured in position so that the yoke will be retained upon the animal.

The upper end of the frame bar 2 projects above the upper end of the frame bar 1, as shown at 6 in Fig. 1, although the upper portions of the bars may be coterminous if preferred. To the upper extremity of the yoke, I pivotally attach a lever 7 which, as shown in Fig. 1, will extend forwardly above the animal's neck to a point above her head and at its forward end this lever terminates in a hook 8 which is adapted to engage over an upper fence wire. The rear end of the lever is disposed in rear of the yoke and has a cross bar 9 secured thereto, a plate 10 being secured upon the cross bar and having its rear portion turned downwardly and formed into spurs 11 which normally lie just above the neck of the animal so that a slight rocking of the lever will cause the points of the spurs to prick the neck of the animal and thereby impart a sensation which will cause the animal to immediately back away from the fence although the flesh of the animal will not be pierced to such an extent as to cause any serious injury. The lever is normally held in the position shown in Fig. 1 with the points of the spurs out of contact with the animal's skin by a contractile spring 12 which has one end attached to the lever in advance of its pivot 13 and its lower end engaged in an eye 14 carried by the bolt 3. To limit the upward movement of the rear end of the lever under the influence of the spring 12, a check or stop element, which may conveniently be a chain 15, is attached to the lever at one end and at its opposite end is engaged in an eye 16 also carried by the bolt 3. To prevent breakage of the spring 12 by contact with fence wires or other objects as well as to prevent a fence wire becoming enmeshed in the spring, I provide a fender 17 which may conveniently be a short flat metal strap or bar secured at its upper end to the lever and depending therefrom in advance of the spring, as clearly shown in Fig. 1.

Should the animal move against the fence and attempt to burrow or crawl through or under the fence, the hook 8 on the front end of the lever will become engaged with a fence wire and will be thereby caused to move upwardly and rearwardly so that the lever will rock upon its fulcrum 13 and the spurs 11 forced against the back of the animal or the upper part of her neck. The momentary pricking sensation thus given the animal will cause her to at once back away from the fence so that there will be no damage done to the fence and injury to the animal will be prevented. The device is exceedingly simple and may be produced at a very slight cost.

Having thus described the invention, I claim:

1. An animal poke comprising a yoke adapted to be fitted about the neck of the animal, a lever fulcrumed between its ends upon the upper end of the yoke and adapted at its front end to engage a fence wire and be rocked thereby, a spur carried by the rear end of the lever, a contractile spring attached at one end to the lever in front of the yoke and at its opposite end to the front side of the yoke to yieldingly hold the spur away from the animal, and a flexible connection between the rear portion of the lever and the rear side of the yoke to limit the movement of the lever under the influence of the spring.

2. An animal poke comprising a yoke adapted to be fitted about the neck of the animal, a lever fulcrumed upon the upper end of the yoke and constructed at its front end to engage a fence to be rocked thereby, a spur carried by the rear end of the lever, a contractile spring attached to the lever and to the front side of the yoke to hold the spur normally away from the animal, a flexible connection between the rear portion of the lever and the rear side of the yoke, and a fender secured to and depending from the lever in front of the spring.

In testimony whereof I affix my signature.

AUGUST W. SYNOGROUND. [L. S.]